S. J. FISHER.
COATING MACHINE.
APPLICATION FILED MAY 17, 1911.

1,172,693.

Patented Feb. 22, 1916.
7 SHEETS—SHEET 1.

Fig. 1.

WITNESSES:

INVENTOR.

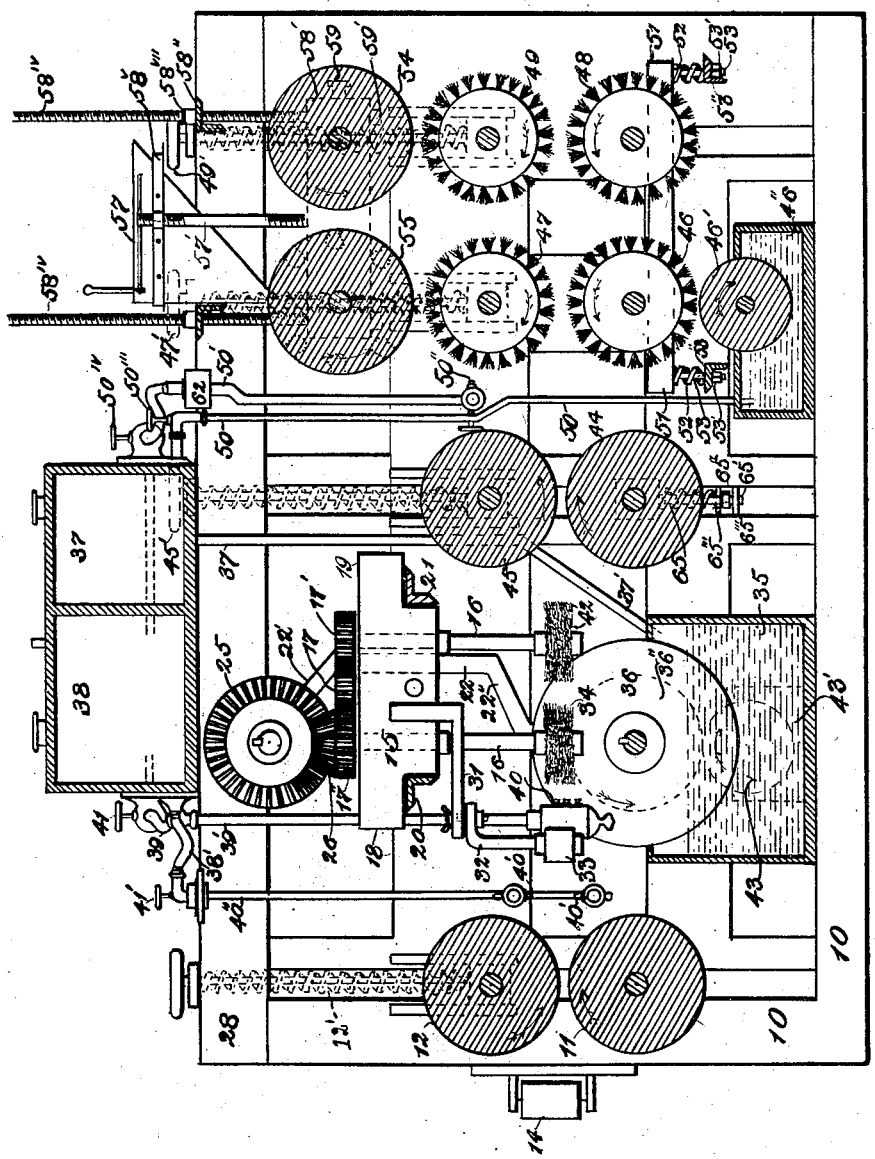

S. J. FISHER.
COATING MACHINE.
APPLICATION FILED MAY 17, 1911.
1,172,693.
Patented Feb. 22, 1916.
7 SHEETS—SHEET 3.
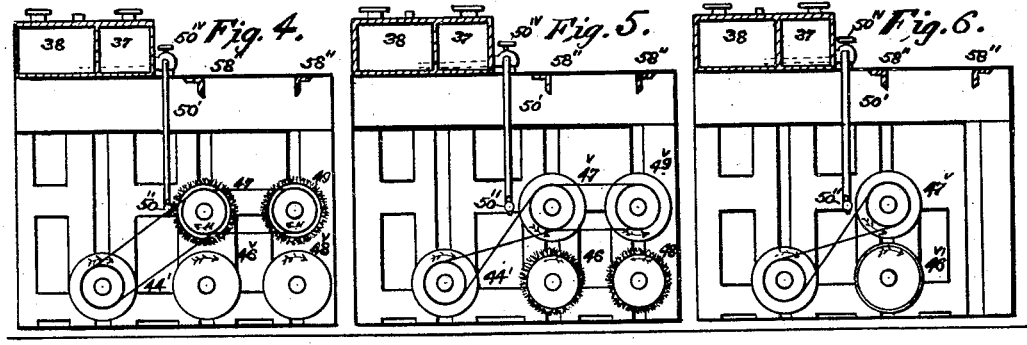
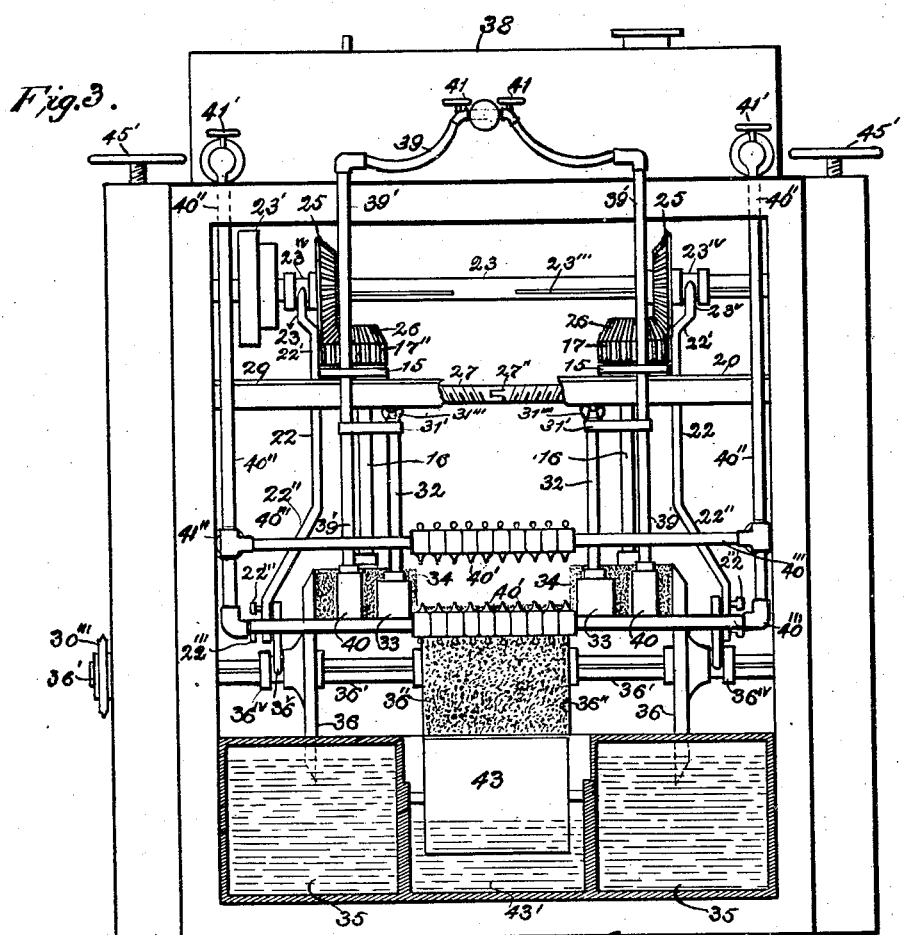
WITNESSES:
INVENTOR.

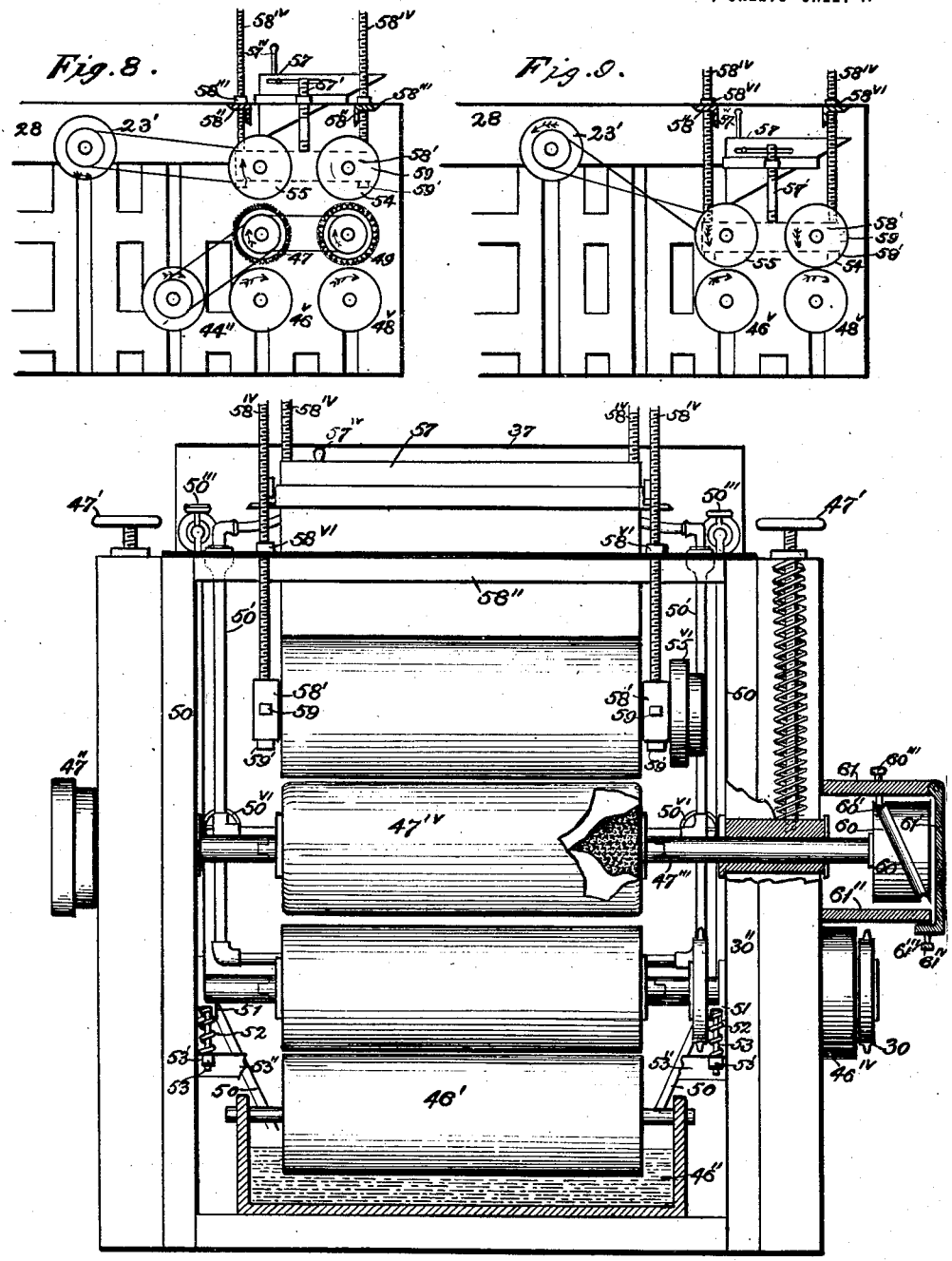

S. J. FISHER.
COATING MACHINE.
APPLICATION FILED MAY 17, 1911.
1,172,693.
Patented Feb. 22, 1916.
7 SHEETS—SHEET 5.
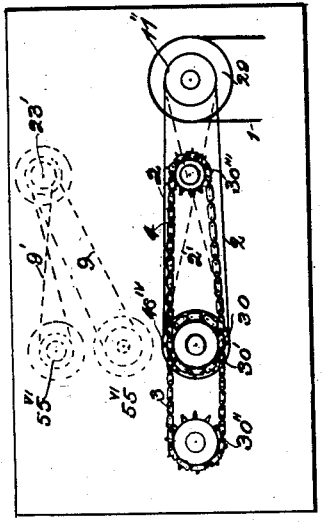
Fig. 10. (left)
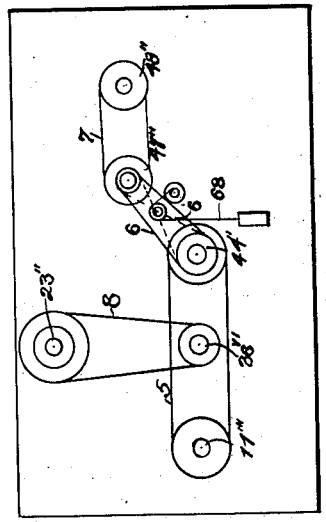
Fig. 11. (right)
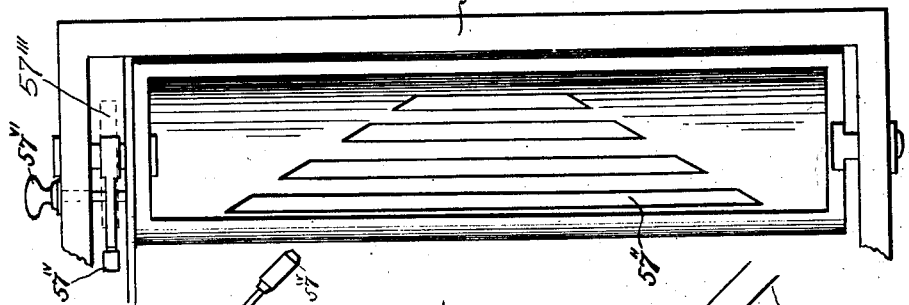
Fig. 12.
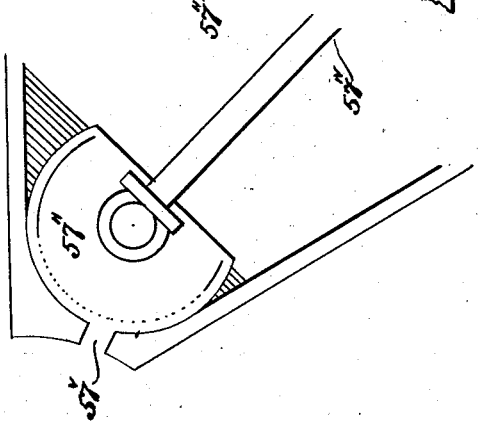
Fig. 13.   Fig. 14.
WITNESSES:
INVENTOR.

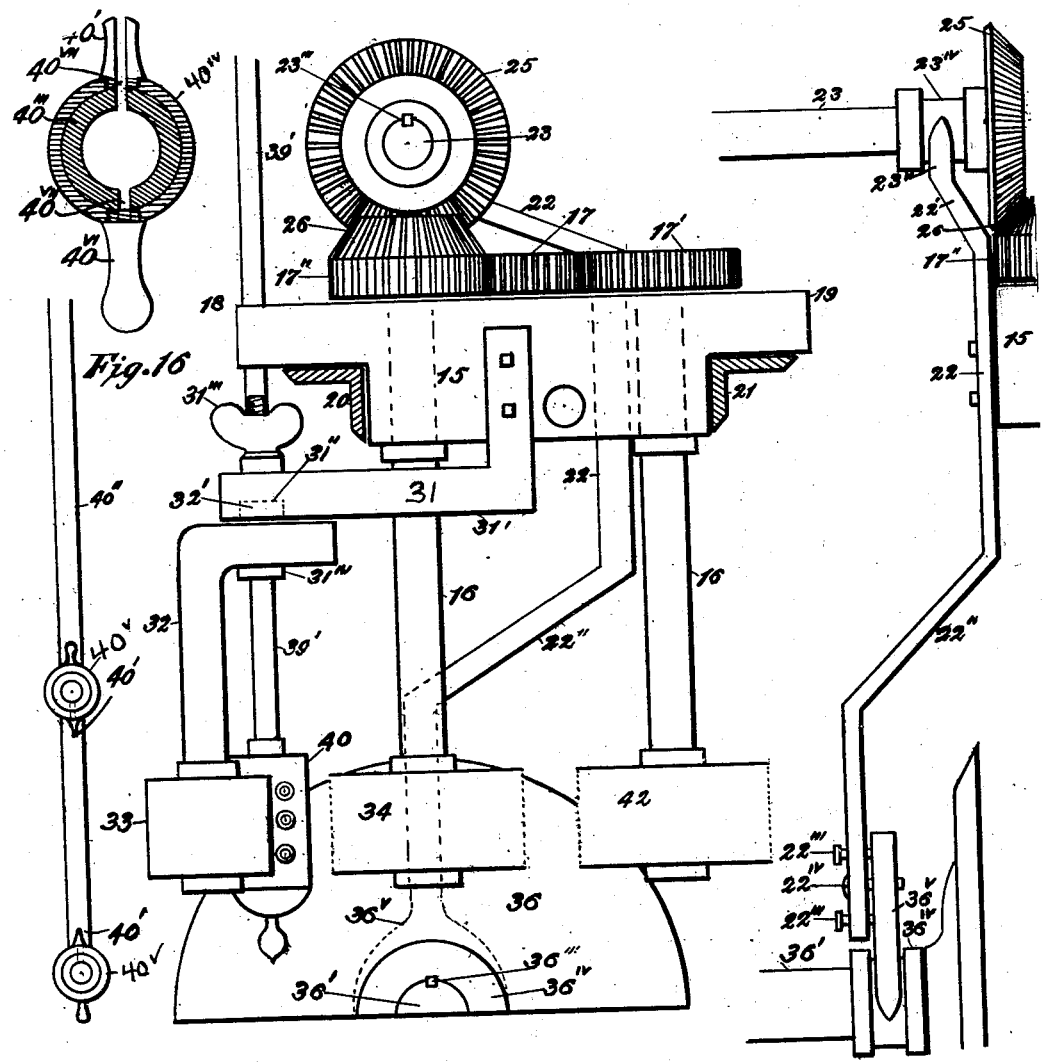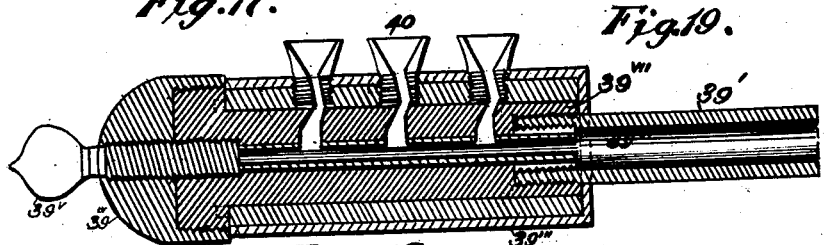

S. J. FISHER.
COATING MACHINE.
APPLICATION FILED MAY 17, 1911.
1,172,693.
Patented Feb. 22, 1916.
7 SHEETS—SHEET 7.
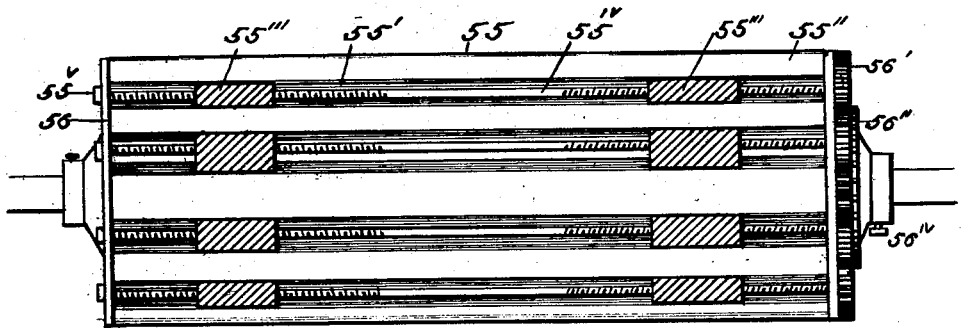
Fig. 20.
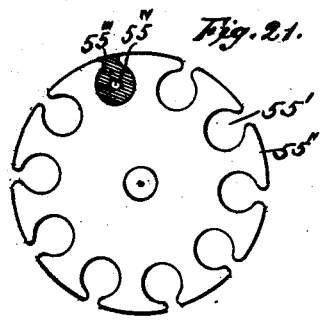
Fig. 21.
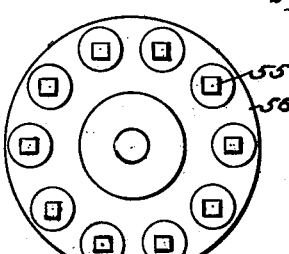
Fig. 22.
Fig. 23.
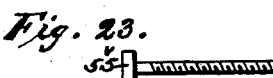
Fig. 24.
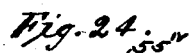
Fig. 25.
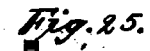
Fig. 26.
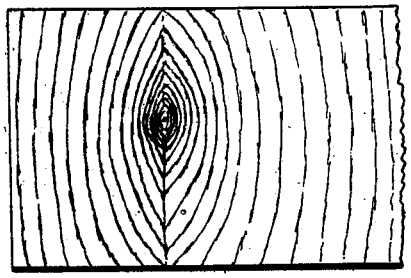
Fig. 27
Fig. 28.
WITNESSES:
INVENTOR.

UNITED STATES PATENT OFFICE.

SAMUEL JAMES FISHER, OF ASHEVILLE, NORTH CAROLINA.

COATING-MACHINE.

1,172,693.      Specification of Letters Patent.      Patented Feb. 22, 1916.

Application filed May 17, 1911. Serial No. 627,756.

*To all whom it may concern:*

Be it known that I, SAMUEL JAMES FISHER, a subject of His Britannic Majesty George the Fifth, King of England, Ireland, Scotland, and Wales, residing at Asheville, in the county of Buncombe and State of North Carolina, have invented a new and useful Coating-Machine, of which the following is a specification.

This invention relates to machinery designed for coating surfaces of wood or metal, herein called stock, consisting of strips of wood or metal, molding, frames and framing mold, trim, boards, finished surfaces of wood and metal timbers, planks, pieces of wood and metal designed for interior finish and furniture, woodenware and prepared surfaces designed, manufactured or prepared for being coated by paint, varnish, lacquer, shellac, stain, enamel, scumbling, wood filler (paste and liquid,) or other liquid substance designed for priming, staining, filling, rubbing down and finishing the same or any desired face or portion thereof while such stock is in a "knocked down condition" or before it is assembled.

The primary object of the invention is to provide a machine of this character which will effectually coat, rub down and finish all of the surfaces of the stock with paint, varnish, shellac, stain, oil, enamel, scumbling, lacquer and wood filler, paste or liquid, means being provided for adjusting the various coating members in order to adapt the same for stock which varies in width, thickness and contour.

With the above and other objects in view which will appear as the description proceeds, the invention consists in the combination and arrangement of parts and in the details of construction hereinafter claimed, it being understood that changes in the precise embodiment of invention herein disclosed can be made within the scope of what is claimed without departing from the spirit of the invention.

In the accompanying drawings, forming a part of this specification; Figure 1. is a top plan view of the apparatus; Fig. 2. is a lengthwise sectional view; Fig. 3 is a cross section, front view of the apparatus. Fig. 4 is a side view of a portion of the apparatus designed to illustrate arrangement proposed for treating upper face of stock only by brushes 47 and 49; Fig. 5 is a side view of a portion of the apparatus designed to illustrate arrangement proposed for alternative method of treating lower face of stock by brushes 46 and 48; Fig. 6 is a side view of a portion of the apparatus designed to illustrate arrangement of parts proposed for graining the stock; Fig. 7 is a cross section rear view of the apparatus; Fig. 8 is a side view of a portion of the apparatus designed to illustrate an alternative arrangement of parts for coating the upper surface of the stock by brushes 47 and 49; Fig. 9 is a side view of a portion of the apparatus designed to illustrate arrangement of parts for applying paste filler to porous stock by the rollers 55 and 54; Fig. 10 and Fig. 11 are diagrammatic views of power transmission on both sides of the machine; Figs. 12, 13 and 14 are detail views of the tank 57; Figs. 15 and 16 are detail views of parts of pressure supply pipes showing cross sections of adjustable collar and nozzle; Fig. 17 is a detail diagram of the bearing block 15 with adjustable attachments; Fig. 18 is a detail cross section of the adjustable nozzles 40; Fig. 19 is a detail diagram designed to illustrate the bracket 22 with attachments for adjusting the disks 36. Figs. 20, 21, 22, 23, 24, 25 and 26 are detail drawings designed to illustrate the pocketed roller 55 with adjustable plugs. Fig. 27 represents a portion of the graining roller designed to replace either of the applying or distributing brushes 46, 48, 47 and 49 when stock is being grained. Fig. 28 represents a cross section of the jacketed roller used in pressing paste filler into porous stock.

The coating apparatus is positioned within and supported by a frame 10 which is substantially rectangular and braced on four sides by cross pieces in which the journals for the transverse shafts are arranged, said braces being both horizontal and vertical, the top and lower beams of the frame being so arranged that they may support a plurality of supply tanks.

The driving wheels, belts, cogs and meshes are positioned both within and without the frame 10 and interrelated in such manner as to move synchronously when power is applied to the pulley 29 from a belt 1.

The frame 10 is open at both ends to receive the unfinished and eject the finished product, the stock being introduced at one end and delivered at the other. The dimensions of the frame are such as to comply generally with the kind, character and dimensions of the stock to be coated and the character of the work to be performed.

Arranged adjacent to the receiving end of the apparatus are a plurality of feed rollers 11 and 12, said rollers being arranged one above the other, the upper roller being capable of vertical adjustment and being normally forced downward by a plurality of coiled springs 12' positioned on both sides of said frame immediately above the center of the axis of said feed roller 12. These rollers extend entirely across the frame 10, the stock being fed between said rollers. Arranged immediately in front of said rollers are the adjustable guides 13 and 14 which contact with the sides of the stock and properly direct the same between the feed rollers 11 and 12.

As the stock is passed between the feed rollers, the edges of the same are coated by a plurality of vertically disposed brushes arranged in pairs 34 and 42, each pair of brushes being capable of adjustment transversely of the frame and also independently of each other whenever such independent adjustment is desired, otherwise they are adjusted simultaneously by a common feed device 27 attached to a right and left feed screw, hereinafter to be noted, and operating to position said brushes relative to the stock to be coated. Of these brushes the one of each pair is adapted to apply the liquid to the edges of the stock to be coated, the other of each pair being a distributing brush. Each pair of vertically disposed brushes is mounted in a bearing block 15, the stems or shafts 16 of said brushes (which extend through said block) being provided with gears 17' and 17'', a transmitting gear 17 being arranged between said gears, one of the first mentioned gears, i. e., the gear attached to the stem of the brush applying the liquid to the stock, being formed with a superposed beveled gear 26 in mesh with a drive pinion 25, said pinion being splined on a transversely extending drive shaft 23 and adapted to move with the bearing block 15.

The bearing blocks 15 are both provided with reduced extensions 18 and 19 which rest upon the transversely extending angle irons 20 and 21. A bracket 22 is positioned on each of the bearing blocks 15, said bracket being formed with a plurality of arms 22' 22'', each of said arms terminating in a fork 23$^V$ with curved prongs, the inner surface of which is partially a circle and so formed and with such dimensions as to fit into and grip the grooved boss 23$^{IV}$ of the shaft 23 to which said boss is splined as well as the grooved boss 36$^{IV}$ of the disk 36 which is splined on the shaft 36', said bosses being in each instance splined to rotary shafts extending transversely the frame.

The bracket 22, which is attached in duplicate, one to each of the blocks 15 is a metal arm arranged in a vertical position and depending from each of the blocks 15 and is recurved in both directions from said blocks as shown in the Figs. 3, 17 and 19 above noted, so that the rotary disks 36 which move transversely the shaft 36' advance and retract simultaneously with the movement of the blocks 15, the brushes 34 and 42, the beveled gears 26, the guides 33 and the pinions 25 splined to the shaft 23. In this manner all the machinery and appliances provided for supplying liquid to the edges of the stock are susceptible of simultaneous adjustment proportioned to the size and width of the stock to be coated by operating the device 27'.

The boss 23$^{IV}$ is formed integral with the drive pinion 25 which is in mesh with the gear 26, said gear 26, as before stated, being secured to one of the shafts 16 on which one of the vertical brushes 34 is positioned.

In order to advance or retract the blocks 15 across the machine a right and left feed screw 27 is provided, a suitable device 27' being attached to either end of said feed screw for the convenience of the operator and in order to operate either half of said feed screw independently of the other portion.

The feed screw 27 passes through both sides or portions of the frame 10, as shown in Fig. No. 1, said feed screw being made in two parts of equal dimensions, each part being the duplicate counterpart of the other with the exception only that the screw is reversed on the right and left portions. Intermediate said feed screw 27 there is a coupling device 27'' attached and so adjusted as to enable the operator to couple the duplicate portions of said feed screw and thus unite them into a single shaft forming a right and left feed screw and thereby operate both pinions 25, both bearing blocks 15, both vertical brushes 34 and 42, both beveled gears 26, both brackets 22, both disks 36, both guides 33, and both the bosses 23$^{IV}$ and 36$^{IV}$ simultaneously and in such manner as to advance or retract them transversely the machine along their respective shafts 23 and 36' by turning either of the devices 27' positioned without the framework.

It will be noted that when the feed screw 27 is coupled by said coupling device that it becomes a right and left screw and that with every revolution thereof the pinions 25, bearing blocks 15 and their attachments are moved relative to each other, either approaching toward or departing from the center of said feed screw, advancing and receding equidistantly and simultaneously to accommodate the vertical brushes to the width of the stock, as well as the guides 33 whether said brushes are in or out of contact. Thus the operator may apply coating fluid to either edge of the stock desired without coating both edges and properly position the stock relative to the horizontal rotary brushes.

To the inside face of each of the bearing blocks 15 a metal, rectangular arm 31, depending therefrom is bolted as shown in Figs. 2, 3, and 17. The lower shank 31' of this arm is a horizontal, flat surface perforated near its extremity by a square aperture 31'' into which the block end portion 32' of a second rectangular, metal arm 32 is introduced and fitted in such manner that by turning a thumb screw 31''' from above, which plays through the second arm and block end portion, the lower member may be bolted to the upper either in line with or at right angles to its shank, thus throwing a pair of vertical brushes out of contact with the stock. The lower member 32 terminates in a vertical shank supporting a rotary vertical, guide, roller 33 which contacts with the edge of the stock being coated.

It will thus be noted that the blocks 15, together with their brush carrying mechanism, may be adjusted transversely the machine in order to accommodate themselves to the stock which varies in width. The guide members 33, which are carried by said blocks, properly directing the stock between the brushes. As before stated, the brushes 34 and 42 are arranged in pairs, each pair of brushes being supported by one of the blocks 15, one of the brushes of each pair being arranged to apply the fluid, the other brush being arranged to distribute the same. The brush 34 of each set of vertical brushes receives its supply of coating fluid from a tank 35, disks 36 revolving in said tanks said disks being splined on the shaft 36', the edge portion of each disk applying the liquid to one of the brushes 34.

Each of the disks 36 is provided with a grooved boss $36^{IV}$, to which is secured the arm 22'' of the bracket 22 by means of the curved fork $36^V$ above noted, the boss $36^{IV}$ being splined to the shaft 36' and the disks thus move as the blocks move as shown in Figs. 3, 17 and 19.

The lower fork $36^V$ of the bracket 22 is attached to the arm 22'' of said bracket by means of set screws 22''' and a screw $22^{IV}$ intermediate the same and is thus susceptible of adjustment relative to said bracket and in such manner as to advance or retract the disk 36 relative to the brush 34 and in this manner the quantity of coating fluid supplied to said brushes 34 is regulated to the desired extent.

The tank 35 is supplied from the gravity reservoir 37 which is positioned above the framework of the machine and supported by the upper beams of said framework or in any other suitable manner. The fluid within said reservoir 37 is fed to the tank 35 through the tube 37'. The brushes 34, as well as the disks 36, may be supplied with coating fluid in another manner (as shown in Figs. 2, 3, and 17), this second supplying mechanism being capable of spraying the fluid directly on the stock to be coated or on the disks 36. Arranged adjacent to the reservoir 37 or otherwise positioned relative to the machine is a pressure tank 38 which is adapted to contain the coating fluid, the coating fluid in said tank being under pressure.

The nozzle 40 is positioned at a point slightly in advance of the brush 34 and between said brush and the guide 33 and may be so adjusted as to supply the brush 34 directly with the liquid under pressure.

The nozzles 40' are slightly in advance of the guides 33 and are attached to a transverse member connecting by vertical tubes 40'' with both of the flexible connections 38' conveying the coating fluid under pressure. This transverse member is a metal tube 40''' running across and above or below the stock to be coated in such manner that the nozzles 40' may play directly upon the upper or under surface of the stock to be coated. When thus used the nozzles 40' require a rearrangement of the rollers 44 and 45 so that these rollers do not contact with the surface of the stock to be coated and this is done by means of the adjustable screws 45' and 65' attached to the shafts or axis of said rollers. The bearings of the shaft or axis of the roller 44 is supported by an adjustable screw 65' positioned in the framework of the machine.

The transverse metal tube 40''', above mentioned, is connected with a pressure tank 38 positioned above and depends from connections 40'', conveying the fluid under pressure. This transverse metal tube is pierced above and below (as shown in Fig. 16) by a plurality of small apertures $40^{VII}$ which emit the fluid. These apertures are opened and closed by a closely fitting sleeve $40^V$, composed of a plurality of slotted collars $40^{IV}$. Thus the spray may be directed upward on the stock above or downward on the stock below and adjusted to the width of the stock. At both ends of this tube are small valves 41'' which may shut off the supply altogether or diminish it as desired. This tube may be used in duplicate, when desired, one above and one below the surface of the stock so as to coat both surfaces simultaneously as shown in Figs. 2, 3 and 15. The slotted sleeves or collars may be supplied with tips 40', integral therewith to give any desired style of jet. The valves 41″ at the ends of this tube are threaded to it in such manner as to remove the tube when the supply is cut off and replace it by another when desired.

The nozzle 40 is an adjustable nozzle depending from a metal tube supported in such manner as to travel lengthwise the shafts 23 and 36′ in obedience to the movement of the blocks 15. The nozzles 40 are threaded into a hollow, jacketed cylinder 39‴ which turns upon the vertical pipe 39′, being threaded to it. They are so arranged and devised that by turning the tip of a nozzle the flow of the liquid through it may be shut off. A cap 39$^{IV}$ is threaded to the bottom of the cylinder and passing vertically through it a grooved key 39$^V$ is threaded therein as well as into the interior portion or throat of the pipe 39′ so as to function as a conduit as well as a cut off to the nozzles. A groove extends down the shank of this key from the point where it enters the throat of the feed pipe 39′ to the screw next the heft. A core 39$^{VII}$ is arranged within the cylinder intermediate the key and the jacket, being threaded upon the pipe 39′. These tubes 39′ are vertical and terminate above in flexible hose connections 39 with the pressure tank 38. Thus should a suitable valve 41 be opened, fluid which is under pressure in the tank 38 will be sprayed by the nozzles 40 upon the edges of the stock, brushes or disks, as desired. The vertical tubes 39′ terminating in the nozzles 40 are attached to the portions 31′ of the arms supporting the guide rollers 33.

It will thus be noted that the brushes 34 may be dispensed with as the same are merely applying brushes, the spraying members in this instance performing the same functions as the applying brushes. In this connection, however, the distributing brush 42 can be used, said brush evenly distributing the fluid on the edge portions and the horizontal, rotary brushes 46, 47, 48 and 49 or either pair or any of them may be used as distributing brushes for the lower and upper or either face of the stock.

It will be noted that the shaft 36′ may be provided with a transversely extending rotary brush 36″ as shown in dotted line in Fig. 2, this brush to receive its supply of coating liquid from a feed roller 43, which is arranged within the tank 43′, said tank 43′ being positioned within the tank 35, this applying mechanism in no way conflicting with the disks which apply the fluid to the vertically arranged brushes. There is a spline 36‴, continuous in its extent from both of the end portions of the shaft 36′ in order to enable the shaft to be withdrawn from the disks and bosses to properly position a rotary brush thereon intermediate the disks 36. This brush 36″, when employed, is an applying brush to coat the under surface of the stock (as shown in Fig. 3).

As the stock emerges from the vertically disposed brushes 34 and 42 it is grasped by the feed rollers 44 and 45, which are similar in construction to the feed rollers 11 and 12 and geared to the same speed, the feed roller 45 being adjustable vertically in the same manner as the feed roller 12. The roller 44 rests upon a bearing which works in a vertical, slotted aperture, which may be removed or lowered by a suitable mechanical contrivance 65′. These feed rollers are adapted to conduct the stock to a mechanism which may apply the coating to either one or both of its faces. This mechanism consists of the transversely extending rotary brushes 46, 47, 48 and 49, the brushes 46 and 48 being arranged to apply to the lower face of the stock, (as shown in Fig. 5) the brushes 47 and 49 applying the fluid to the upper face of the stock, (as shown in Fig. 4), the brushes being so positioned that, as before stated, both faces of the stock may be coated (as shown in Fig. 2) or either face of the stock coated, as desired. Pressure rolls 47$^V$ and 49$^V$ (as shown in Figs. 5 and 6) may be substituted for either of the rotary, horizontal brushes 47 and 49 or both as these brushes rotate on shafts, which like the shafts of brushes 46 and 48, are coupled by a device between the end portion of said brush axle and the axle of the shaft to which power is applied (as shown in Figs. 1 and 7). Thus the shafts to which these brushes 46, 47, 48 and 49 are affixed may be uncoupled within the framework from the shaft end of the axle attached to the driving gear. These brushes 46, 47, 48 and 49 revolve in an opposite direction from the feed rollers and at a greater rate of speed. They are rotated by a band wheel and sprocket and chain. In the event that it is desirable to substitute a pressure roller for any of these brushes the rotation of its shaft would be reversed (as shown in Figs. 5, 6, 10 and 11) so as to revolve in the same direction with the feed rollers and this may be done in any suitable manner.

When the lower or under surface of the stock is to be coated the brush 46 is arranged to apply the fluid to the same. This brush receives its supply of paint from the roll 46′ which is arranged to rotate within the tank 46″, said tank receiving its supply of fluid through the supply pipe 50 which extends from within the tank 37. The brushes 46 and 48 are supported by a member 51 which is arranged to rest upon a plurality of spaced angle bars 53″, said member 51 being spaced from said angle bars by coiled springs 52, there being adjusting screws 53 secured to either end of said member which is threaded to receive them, said screws, passing through said angle bars and member, being adjustably held by means of nuts 53', which are arranged upon their end portions. Thus the brushes 46 and 48 are adjustable in order to apply the coating fluid as desired and to lower them out of contact when necessary, and they in contact with the stock by means of the springs 52, the upward movement of the brushes, being restricted by means of the nuts 53'.

The upper surface of the stock is coated by the brushes 47 and 49, which are adjustable in the same manner as the upper of the feed rollers, there being suitable adjustable screws 47' and 49', the brushes being spaced from the upper beams of the frame by means of coiled springs, performing the same function as the coiled springs of the said feed rolls. The brushes 47 and 49 consist of an applying and distributing brush, the brush 47 applying the material and the brush 49 distributing it.

Arranged immediately above the brushes 47 and 49 and supported by a framework 58 resting on a plurality of angle bars 58'' to which said framework is attached by bolts and nuts are the rollers 55 and 54 which are positioned within the said framework attached to the angle bars, which angle bars 58'' are attached to and supported by the frame 10 of the entire machine. This secondary framework 58 in which the rollers 55 and 54 are positioned is adapted to support a tank 57, said tank having a tapering bottom formed of an inclined plane which terminates in a gate 57'' and adjustable opening 57$^V$ immediately above the roller 55 and its axis. This tank is constructed of four sides or walls, three of which are perpendicular and one an inclined plane inclining downward at an angle from the top of the tank until it reaches a perpendicular wall or side, to which it is made integral. The gate and adjustable opening as shown in Figs. 1, 2, 12, 13 and 14 are situated where the inclined plane and perpendicular wall unite and are so constructed that by operating a lever 57$^{IV}$ from within the tank and projecting above it, which lever plays in a slotted guide 57''' attached to the top of the tank, the adjustable opening may be opened, closed or enlarged by a single operation of the lever. A traveling thumb-screw 57$^{VI}$ regulates the position of the lever 57$^{IV}$. This adjustable opening arranged in said tank is capable of emitting a determinable amount of fluid and is regulated as noted, to comply with the width of the stock to be coated and the character of coating fluid within the tank. The gate 57'' is a segment of a hollow cylinder as shown in Figs. 12, 13 and 14, and is closed at both ends and so confined within the lower angle of the tank 57, upon bearings let into the walls of the tank, as to be actuated rotatably by a lever 57$^{IV}$. It is seated within a concavity integral with the tank and constructed to correspond with the proportions of the gate. Lengthwise this concavity a slotted opening 57''' is horizontally disposed directly above the upper surface of the roller 55. This gate is provided with a plurality of spaced, parallel slots or openings graduated in length and so arranged that any of them may coincide with the opening in the tank.

The roller 55 (as shown in Figs. 2, 7, 8, 9, 20, 21, 22, 23, 24, 25 and 26) is a pocketed roller adapted for paste filler but the character of this roller will vary as the same may be readily removed and replaced by a smooth surfaced roller. Rollers with pockets of various shapes, sizes and varying in number will be necessitated by the various kinds of work which this machine is adapted to perform. Where the roller is pocketed the same will be closed at the ends of the pockets by adjustable plugs 55''' which may be secured in any suitable manner, there being two plugs to each pocket. These plugs are adapted and arranged to move within the pockets 55' in such manner as to vary the length of the pocket receiving the paste filler or other fluid and the length of the pocket may in this manner be adjusted to the width of the stock to be coated and the length of the sluiceway or adjustable opening in the tank 57 above it and from which the fluid is supplied. The roller 55 is closed at both its ends, as shown in Figs. 20, 21, 22, 24 and 25, and the plugs 55''' are threaded upon right and left screws 55$^{IV}$ passing lengthwise through its pockets 55' and parallel to the shaft of the roller, as shown in Fig. 20. These plugs are adjusted by means of gears 56' attached to the ends of the right and left screws, said gears meshing with a center gear 56'' which is mounted upon the cap of the pocketed roller as shown in Fig. 25. At the opposite end of the roller 55 these screws, passing through a cap, terminate in bolt heads, as shown in Figs. 21 and 24. Thus by operating a device 56''' the plugs within the pockets are all adjusted simultaneously.

The roller 55 is adapted to supply the applying rotary brush 47 with the coating fluid intended for the stock. The roller 55 receives its power from the shaft 23 by means of a band or belt 9 within the framework 10 and a pulley 55$^{VI}$ on the roller 55.

The roller 54 is provided with a rubber jacket fast with the roller and when the stock is being treated with paste filler this roller is employed as a pressure roller to distribute and compress the filler within the pores or grain of the stock. This roller is rotated by the forward movement of the stock, applied directly to the roller or intermediately. It will be noted that the roller 54 is only used in this manner when the brushes 47 and 49 are removed and the smaller frame 58 carrying the rollers 55 and 54 is detached from its position above the brushes 47 and 49 and suspended from the angle bars (as shown in Fig. 9). This is a process employed for applying paste filler to wormy chestnut and other material requiring such treatment.

The brush 47 may be supplied with coating fluid in another manner, to wit: from a jet or spray suitably positioned and controlled with reference to the width and condition of the stock to be coated and connected by means of a hose and pipe 50′ or flexible tube with a valve 50$^{IV}$ leading to the pressure tank 38. When this is done a beam 62 extending transversely the frame 10 and resting on both its beams 28 will be attached to said framework to properly position the pipe and hose relative to the supply brush 47 (as shown in Figs. 1, 2 and 7).

The smaller frame 58 carrying the rollers 55 and 54 may be thus dispensed with temporarily, likewise the tank 57 (as shown in Figs. 4, 5 and 6). This tank 57, is adjusted to the roller 55 by a plurality of adjustable screws 57′.

When it is desired to coat only the edges and upper surface of the stock or only the upper face the rotary brushes 46 and 48 will be removed and rollers 46$^V$ and 48$^V$ substituted which will revolve in the same direction as the pressure rollers used for feeding the stock and in the same direction in which the stock travels (as shown in Figs. 4 and 8).

The brushes 48 and 46 and the rollers supplanting them rotate on shafting which is coupled within the framework of the machine between the end of the rollers and brushes and the framework and in such manner as to enable the operator to remove and replace the rollers and brushes conveniently and expeditiously. The coupling devices and clutches attached to the shafting may be any ordinary clutch or coupling device.

For wiping the face of the stock after the application of paste or liquid filler the brushes 49 or 47 are wrapped with suitable material or jacketed in any convenient manner with any suitable textile or material (as shown in Fig. 7).

When it is desired to grain the stock rollers for that purpose will be substituted for either the brushes 48 or 46 or both, the coating of the stock being performed by the liquid applying brushes or nozzles in advance of the graining. The rollers for graining will be covered by a suitable graining and absorbent material (as shown in Figs. 6 and 27).

For the purpose of wiping filler from the stock a return grooved cylinder 60 attached to a shafting is supplied at the end of the shaft farthest removed from the exterior portion of the shaft to which the power is applied. A pin 60″ is affixed to the framework 61 in a suitable manner relative to such grooved cylinder or cam which contacts with and travels in the return groove 60′ and the power is applied by means of a weighted belt or belt with belt tightener 68 (as shown in Fig. 11). Thus the shaft oscillates in its journal bearings and at the same time revolves (as shown in Figs. 1 and 7). It will be noted that by this or by a similar device, introduced, for that purpose, the material previously filled with paste filler contacts with an oscillating wiper 47$^{VI}$ which both revolves and oscillates to any requisite extent. In this way the dried paste filler previously applied is effectually removed from the surface of the stock without pulling the filler out of the grain and pores of the wood.

The application of power for driving the various feed rollers, pinions, disks, brushes and shafts is first made to a large band wheel 29 attached to the shaft of the lower of the pressure rollers, to wit: the feed roller 11 as shown in Figs. 1 and 10. There are two other band wheels 11″ and 11‴ on said shaft for transmitting power to the other members of the machine, to wit: one on each end portion thereof thus positioning three band wheels or pulleys on the shaft 11′ to the roller 11. Intermediate the power wheel and the framework of the machine on the shaft 11′ to the feed roller No. 11, there is a pulley 11″ connected with the pulley 46$^{IV}$ on the shaft of the brush 46 by a twisted belt 2′. On the same end of the shaft to the brush 46 two sprocket wheels 30 and 30′ are positioned, one of which is connected by a chain drive 3 with a similar sprocket wheel 30″ likewise positioned on the shaft to the brush 48, the other is connected by a chain drive 4 with a smaller sprocket wheel 30‴ attached to the shaft 36′ (as shown in Figs. 1, 7, and 10.)

On the other side of the machine and framework from that just mentioned there is a pulley 11‴ on the shaft of the feed roller No. 11, to which is attached a belt 5. This belt travels from the pulley 11‴ on the shaft 11′ of the feed roller No. 11 to a similar pulley 44′ attached to the shaft of the feed roller 44, both of said pulleys and their connecting belt are positioned without the frame No. 10.

Affixed to the shaft of the feed roller 44 and positioned without the frame 10 is a suitable transmitting device or variable feed 44″ for increasing or diminishing the speed of the brushes 47 and 49 which are connected therewith. This variable speed device is made adjustable to the shaft of the feed roller 44 and secured thereto in any suitable manner. Attached to the shafts of the brushes 47 and 49 and positioned without the frame 10 are pulleys 47′ and 49′ which may vary in size and character with the demands of the work to be performed. The shafts of these brushes 47 or 49 are fitted into journals which permit them to oscillate when proper devices for that purpose are attached.

An additional pulley is attached to the shaft 36' and positioned without the frame 10. From this pulley power is transmitted to a pulley on the shaft 23. Attached to the shaft 23 are two pulleys, one of which 23' is positioned within and the other 23'' without the frame 10.

From the pulley 23' positioned on the shaft 23 within the frame 10 power is transmitted to a similar pulley $55^{VI}$ positioned within said frame and attached to the shaft of the roller 55.

A variable speed device may be supplied to the exterior portion of the shaft 23 for increasing or diminishing the speed of the brushes 34 and 42 which contact with the edges of the stock.

It will be noted that there are three well defined methods or processes of applying liquid coating to the stock.

The first process is to apply the liquid coating to the stock by means of rotary brushes and rollers which receive the liquid through the media of rollers and disks contacting with the exterior surface of the rotary brush and revolving in supply tanks which are fed from a gravity reservoir by means of an automatic valve and supply pipe. In the case of the roller 55 the supply is received from a superposed tank or reservoir as above noted.

The second process is to supply the liquid coating by means of jets, sprays and nozzles connected by tubes and pipes with flexible attachments which are fed from a pressure tank superposed. In this process the liquid is applied directly to the face of the stock by sprays, atomizers and jets which are adjustable in such manner that the extent or size of the jet or spray varies with the width of the stock to be coated, the character of the coating fluid and the kind of work required.

The third process is to spray the coating fluid directly on the brushes, rollers and disks by means of atomizers, sprays and jets controlled by nozzles and valves and connected with a pressure tank or reservoir superposed.

Wherever the applying brushes contact with the stock they rotate in the opposite direction from that in which the stock travels and at a much greater rate of speed and this is likewise true of the applying rollers and distributing brushes and rollers.

It will be noted that a machine of this character is adapted for coating all kinds of metal or wood stock in any desired manner and with any desired coating fluid where the size, character and contour of the stock is adapted to the machine, the peculiar arrangement and construction of the brushes, which vary in shape and character with the demands of the work, insuring an even distribution of the coating liquid and a like application.

The shape, size and contour of the brushes and rollers vary with the character of the work to be performed. These brushes and rollers are adjustable and may be removed and replaced by the operator when a change in the kind of work or character of the stock is desired.

The many advantages of a coating machine constructed in this manner and above described will be clearly apparent, as it will be seen that the stock may be treated in a plurality of ways and by a plurality of interchangeable devices adapted for various kinds of workmanship. Either or both of the edges and either or both of the faces and either edge or face and all of the edges and faces of stock may be coated by once passing the stock through the machine, likewise both of the faces and either of the edges may be coated. Stock may be also filled and dried filler may be also removed by the machine and the surface of the stock may be grained, sandpapered down and rubbed in any desired manner.

What is claimed is:

1. In a coating machine, two sets of vertically disposed, rotary brushes, each set depending from a supporting block disposed between and resting upon spaced beams transverse the framework, a drive shaft horizontally positioned above and parallel to said beams, vertical shafts for said brushes terminating in gears seated on the bearing blocks, said shafts being journaled in said blocks, the gear of one brush shaft actuating the gear of the other by means of an intermediate gear, a pinion mounted on a shaft of one of each set of said brushes meshing with a beveled gear splined on said drive shaft and arranged to rotate therewith as well as travel lengthwise the shaft along the spline in obedience to the movement of said blocks.

2. In a coating machine, a supporting track horizontally arranged transverse the apparatus, a plurality of brush supporting blocks disposed thereon and adapted to travel thereon when actuated by a common feed as described, said feeding device arranged transverse the apparatus and journaled within the frame thereof and operable to advance or retract said blocks relative to each other, a plurality of vertically disposed, rotary brushes arranged in pairs, each pair of said brushes being mounted on vertical shafts journaled in said blocks and coöperable with each other by means of gears secured to the shafts of said brushes and said gears and means to actuate the same.

3. In a coating machine, the combination with a supporting track arranged horizontally and transverse the apparatus of a plurality of brush-supporting blocks disposed thereon and a right and left screw-feed journaled within the frame of the apparatus and proceeding transversely across the same and through the threaded portions of said brush-supporting blocks, said feed being operable to advance or retract said brush-supporting blocks relative to each other, a coupling intermediate said feed-screw and its threaded portions, vertically disposed, coöperable, rotary brushes mounted on stems journaled in said brush-supporting blocks and adapted to coat the edge portions of the stock to be treated.

4. In a coating machine, the combination with a horizontally disposed, rotary brush, adapted to coat the face of the stock, of a pressure-supply tank arranged to contain liquid under pressure, valves to said tank, a transverse, perforated pipe disposed adjacent said brush and parallel therewith, flexible tubes connecting said valves with vertical pipes attached to each end of said transverse pipe and communicating therewith, valves to said pipes and a plurality of perforated collars with nozzles attached, said collars being arranged upon said transverse pipe and adapted to open and close its perforations, all of said collars being independently adjustable.

5. In a coating machine, a plurality of vertically disposed, rotary brushes arranged in pairs, said pairs revolving synchronously by means of gears superposed and attached to their shafts and intermediate gears meshing therewith, said shafts being actuated from a pinion attached to one of each pair of shafts and meshing with beveled gears splined by bosses to a horizontal drive shaft extending transverse a supporting frame, bearing blocks supporting each pair of vertical shafts and arranged to advance and recede simultaneously relative to each other upon a right and left coupled screw extending transverse the frame and passing through their threaded portions, parallel members horizontally supporting said blocks and brackets connecting said blocks with said bosses.

6. In a coating machine, a plurality of vertically disposed, rotary brushes arranged in pairs, each pair of brushes being independently adjustable, a block supporting each pair of brushes, rotary guides, independently adjustable, being attached to said blocks and positioned vertically by dependent arms projecting below and in advance of said blocks, said arms being composed of interlocking members, the lower of said members adjustably supporting one of the vertical guide rollers.

7. In a coating machine, a plurality of vertically disposed rotary brushes arranged in pairs, each pair depending from an adjustable bearing block supported by horizontally disposed, parallel members transverse the frame, a tank disposed below said brushes, a plurality of adjustable disks splined by bosses to a rotary shaft intermediate said tank and said brushes, said disks revolving within the tank below and contacting above said shaft with one of each pair of said brushes, each pair of brushes being capable of independent adjustment relative to the stock to be coated.

8. In a liquid coating machine, two pairs of rotary brushes disposed upon vertical shafts journaled in adjustable bearing blocks, gears integral with said shafts and seated on said blocks, pinions arranged upon one of each pair of shafts, intermediate gears between said gears and meshing therewith, beveled gears mounted by bosses on a horizontal drive shaft, said beveled gears meshing with said pinions, a liquid supply tank positioned below said brushes, a second drive shaft parallel to the first and directly below it and intermediate the tank and the said brushes, a plurality of disks splined by bosses to said shaft and co-adjustable with the brush supporting members and independently adjustable relative to the said brushes by means of brackets attached to each of the brush supporting members, each of said brackets connecting one of the bosses on the upper shaft with one of the bosses on the lower shaft and moving as the blocks move, said disks being arranged to contact with and supply liquid to one of each pair of said brushes.

9. In a liquid coating machine, a plurality of vertically disposed brushes, arranged in pairs, brush-supporting members, a tank arranged below said brushes, upper and lower shafts disposed above said tank, a plurality of disks mounted on said lower shaft to convey the liquid to one of each pair of said brushes, two brackets formed with a plurality of arms, each bracket being supported by one of the brush-supporting members, means for supporting said brush-supporting members, means for adjusting said brush-supporting members relative to each other, bosses splined to the lower shaft and adapted to support said disks, bosses splined to the upper shaft and adapted to support gears meshing with gears on the brush-supporting members, said bosses on the lower shaft being connected with the bosses on the upper shaft by said brackets, rectangular arms depending from said brush-supporting members, adjustable guide-rollers vertically disposed upon said rectangular arms, a rotary brush splined to said lower shaft and arranged to contact with the stock to be coated, means for actuating said gears, shafts, disks and brushes.

10. In a coating machine, a framework supporting a frame 58, a tank 57 adjustably supported by frame 58 relative to a roller 55 likewise supported by frame 58, an adjustable opening within said tank coinciding with a lateral portion of the horizontal surface and longitudinal pockets of the said roller 55, adjustable plugs disposed within the pockets of said roller, a horizontally disposed rotary applying brush 47 resiliently supported within the larger supporting frame parallel to and arranged to contact with said pocketed roller beneath the same, said roller and brush being relatively adjustable each to the other and likewise to the stock to be coated, means for actuating said brush and said roller.

11. In a coating machine, the combination with a pressure, supply tank, adapted to hold liquid under pressure, and valves to its outlets, with means for spraying the stock to be coated in advance of the applying brushes and said applying brushes, said means consisting of a perforated tube horizontally positioned transverse the apparatus and adjustable relative to the face of the stock to be coated, slotted collars jacketed to said tube and arranged to turn thereon so as to open and close the apertures in said tube, the applying brushes being adjustably supported relative to the stock to be coated by resilient members and means for rotating said brushes in contact with the stock.

12. In a coating machine, the combination of a pressure tank 25, adapted to hold fluid under pressure, and its valves with means for spraying the contents of said tank upon an adjustable, rotary applying-brush and said brush, said means consisting of a perforated tube or pipe adjustably supported relative to said brush, supporting conduits and flexible members connecting said perforated pipe with said pressure tank and its valves, and means for opening and closing the apertures in said perforated pipe, said means consisting of a plurality of slotted collars, jacketed to said perforated pipe, and contacting with one another so as to form a sleeve, tips to said collars and valves at both ends of said perforated pipe.

13. In a coating machine, the combination of a horizontal, rotary brush, resiliently supported within and transverse a principal frame, a plurality of feed rolls disposed in said frame above and below the path of the stock and in advance of said brush, a pressure roll, parallel with and immediately below said brush and adjustable guides vertically positioned in said frame on both sides of the path of the stock and in advance of said brush with a pressure tank, a plurality of valves controlling its outlets, a plurality of flexible tubes connecting said valves with vertical pipes which connect with and support a pipe parallel to and adjacent said brush, said vertical pipes, a plurality of adjustable spraying devices laterally disposed on said parallel pipe next said brush and adjustable means for directing the spray thereon, said means consisting of adjustable collars, comprising a sleeve.

14. In a coating machine, the combination of a pressure tank, a plurality of valves to control its output, a plurality of adjustable pipes connected therewith by flexible tubes, a plurality of spraying members arranged adjustably on said pipes relative to the stock to be coated and in advance of the brushes, connecting with the passages in the pipes, with a plurality of horizontal, rotary brushes disposed transverse the frame and arranged to contact with the face of the stock, a plurality of feed rolls likewise disposed and in advance of the brushes, a plurality of vertically disposed brushes rotatably mounted in connection with vertical guide rollers and co-adjustable therewith, said brushes and rollers being independently adjustable relative to the stock, and disposed on both sides of its path, said brushes being arranged in pairs upon shafts actuated from a superposed, horizontal shaft and adjustable gears mounted thereon by means of pinions meshing therewith and actuating the shafts of one of each pair of intergeared brushes, a horizontal shaft arranged below and parallel to said shaft, a plurality of disks splined by bosses to said shaft, said disks revolving within a subjacent tank and contacting with one each of the vertically disposed brushes, brackets fastened to the brush supporting members, which travel within the frame upon longitudinal members integral therewith, said brackets connecting each of the upper with each of the lower of the bosses splined to the drive shafts carrying said beveled gears and said disks, tanks arranged below said brushes and means for rotating said brushes and feed rolls.

15. In a coating machine, the combination of a plurality of horizontally disposed, adjustable, resiliently supported, rotary brushes with a plurality of vertically disposed, rotary brushes arranged in pairs, each pair being adjustable independently of the other or simultaneously relative to the stock to be coated, a plurality of feed rolls in advance of said horizontal brushes, said feed rolls being disposed in pairs, the one above the other and within a principal frame, the upper of said rolls being adjustable relative to the stock to be coated, a plurality of vertical, guide rollers adjustable with the vertically disposed brushes or independently relative to the width of the stock to be coated and on either side of the path of said stock, a pressure tank with valves controlling its outlets, a plurality of vertically disposed spraying members adjacent said vertically disposed brushes and arranged upon vertical pipes flexibly connected with the valves in the pressure tank and adjustable relative to the width of the stock to be coated, said spraying members being arranged to spray the stock or the vertically disposed brushes and being adjustable in the same manner as said brushes.

16. In a liquid coating machine, the combination of a plurality of horizontally disposed, resiliently supported, rotary brushes adjustable relative to the stock to be coated and actuated by power fed to their shafting with an adjustably pocketed roller positioned above and adjacent to one of said brushes, likewise rotated, a tank positioned above said roller with an adjustable opening coinciding with a portion of the upper surface of said roller, a gate within said tank to regulate the size of said opening, a lever controlling said gate.

17. In a coating machine, the combination of a horizontal rotary brush, disposed on an adjustable shaft arranged transverse the apparatus with a return grooved drum or cylinder, affixed to the end of said shaft projecting beyond its bearing, a pin disposed adjacent to said cylinder and arranged to project against and within the concavity of its groove and means for rotating said shaft.

18. In a coating machine, the combination of a jacketed roller disposed within a frame 58 with a longitudinally pocketed parallel roller, the pockets of said roller being fitted with adjustable plugs to vary their length, a superposed tank adjustably disposed in said frame relative to the surface and pockets of said roller, an opening within said tank arranged to contact laterally with the surface and pockets of said roller as it revolves, a gate within said tank to enlarge or diminish the size of said opening, means for controlling said gate by a lever, means for lowering said rollers next the stock to be coated, means for rotating said pocketed roller against the surface of the stock to be coated.

19. In a coating machine, a pressure tank with valves controlling its outlets, vertical pipes flexibly connected therewith, a plurality of adjustable nozzles laterally disposed on cylindrical members threaded to the lower termini of said pipes, a key with a grooved shank introduced vertically into the core of each of said cylinders to conduct the liquid from the pipes to the nozzles, valves attached to said pipes, a plurality of vertically disposed brushes arranged in pairs by means of adjustable bearing blocks supported transversely the apparatus, said blocks supporting said pipes, a plurality of disks rotatably actuated by a transverse shaft horizontally positioned below said brushes, each of said disks contacting with one of each pair of said brushes, said disks being co-adjustable with the brushes relative to the stock to be coated and independently adjustable relative to said brushes, means for adjusting the nozzles relative to the disks by turning the cylinders upon their supporting members, to wit: the vertical pipes.

In testimony that I claim the foregoing as my own, I have hereto affixed my signature in the presence of two witnesses.

SAMUEL JAMES FISHER.

Witnesses:
WM. FRANCIS,
CHAS. E. J. JONES.